United States Patent [19]
Horner et al.

[11] Patent Number: 6,065,284
[45] Date of Patent: May 23, 2000

[54] REFRACTORY HEAT TRANSFER MODULE

[75] Inventors: Mervyn H. Horner, Del Mar; Holger H. Streckert, Rancho Santa Fe, both of Calif.

[73] Assignee: General Atomics, San Diego, Calif.

[21] Appl. No.: 09/027,361

[22] Filed: Feb. 20, 1998

Related U.S. Application Data

[60] Provisional application No. 60/053,775, Jul. 25, 1997.

[51] Int. Cl.⁷ ....................................................... G21D 1/00
[52] U.S. Cl. ..................... 60/203.1; 60/641.15; 126/680; 244/173
[58] Field of Search ................................ 60/200.1, 203.1, 60/641.15, 641.8; 244/169, 173, 172; 126/680, 681, 682

[56] References Cited

U.S. PATENT DOCUMENTS

| | | | |
|---|---|---|---|
| 3,594,803 | 7/1971 | Pucillo | 343/720 |
| 3,843,896 | 10/1974 | Rason et al. | 310/4 |
| 4,482,837 | 11/1984 | Koizumi et al. | 378/144 |
| 4,528,978 | 7/1985 | Robinson | 60/641.8 |
| 4,781,018 | 11/1988 | Shoji | 60/641.8 |
| 4,876,854 | 10/1989 | Owens | 60/641.8 |
| 5,113,659 | 5/1992 | Baker et al. | 60/641.8 |
| 5,459,996 | 10/1995 | Malloy et al. | 60/200.1 |

OTHER PUBLICATIONS

Streckert, et al., "Integrated Solar Upper Stage Alternate Receiver", IECEC 1997 Conference, Jul. 28, 1997.

Miller, et al., "Design and Fabrication of a High Temperature Solar Receiver Cavity", IECEC Paper No. AP–398, *ASME* (1995), pp. 755–761.

Malloy, et al., "Trade Studies on Integrated Solar Upper Stage (ISUS) Systems", IECEC Paper No. AP–399, *ASME* (1995), pp. 749–753.

Westerman, "Solar Bi–Model: The Challenge of Developing Advanced Space Power and Propulsion Technology", IECEC Paper No. AP–400, *ASME* (1995), pp. 737–742.

Kennedy, et al., "Mission Applications of an Integrated Solar Upper Stage (ISUS)", IECEC Paper No. AP–401, *ASME* (1995), pp. 731–736.

*Primary Examiner*—Charles G. Freay
*Attorney, Agent, or Firm*—Fitch, Even, Tabin & Flannery

[57] ABSTRACT

An Integrated Solar Upper Stage receiver is shown for efficiently transferring heat from concentrated solar flux to an interior surface of an annular structure having a plurality of parallel passageways through which hydrogen gas flows and is heated to a high temperature to serve as a propellant in order to raise the ISUS from a low earth orbit to a geosynchronous orbit or the like. The receiver comprises a body of refractory material, such as graphite, in which each of the hydrogen flow passageways is lined with a thin tube of wrought rhenium metal. The exterior surfaces of the receiver are similarly clad with wrought rhenium, or coated with CVD rhenium, to prevent evaporation of graphite at high temperatures in outer space. Inlet and outlet manifolds which communicate with the rhenium-lined passageways are also constructed of wrought rhenium metal and serve to totally isolate the hydrogen from the graphite heat sink material so as to avoid chemical reaction therebetween. Hydrogen gas from a cryogenic source is thus heated and expanded, serving as a propellant when exhausted through a nozzle.

19 Claims, 3 Drawing Sheets

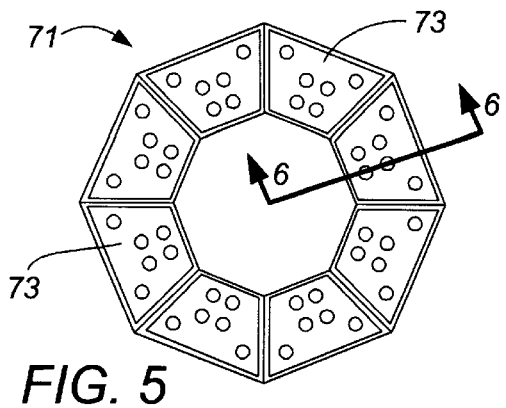
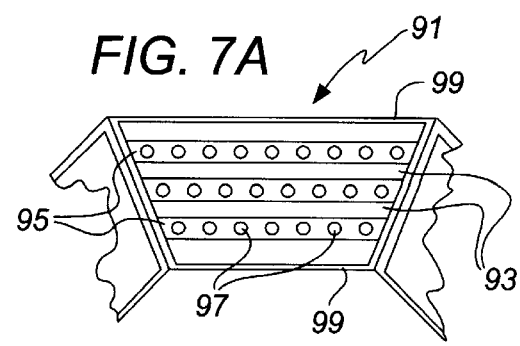
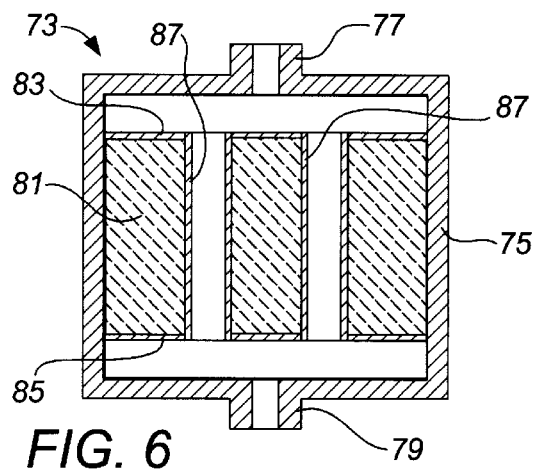
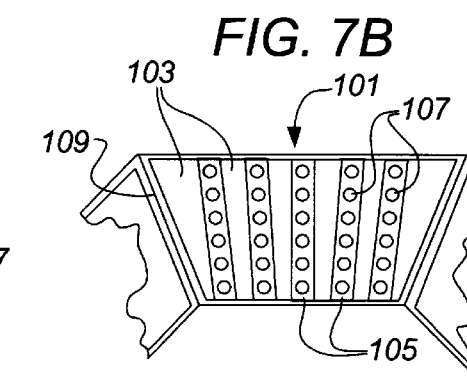
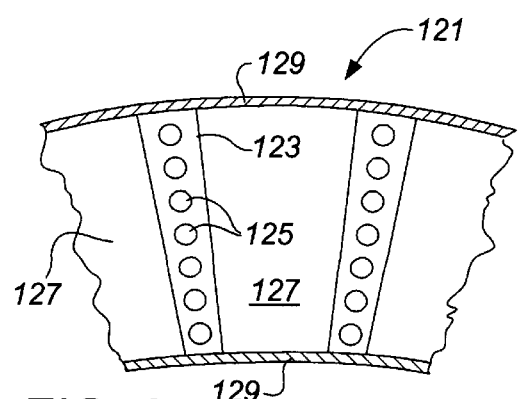
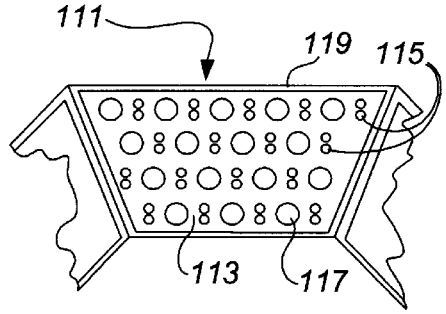
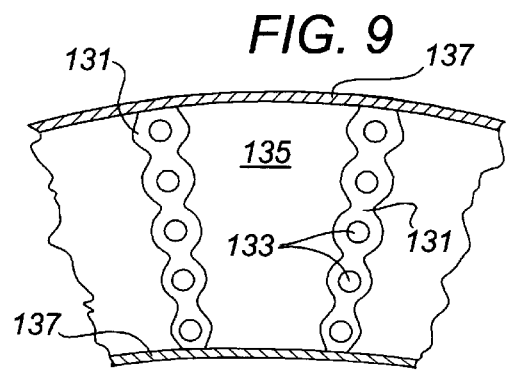

REFRACTORY HEAT TRANSFER MODULE

This application claims priority from U.S. Provisional Application Ser. No. 60/053,775 filed Jul. 25, 1997 entitled Refractory Heat Transfer Module, the disclosure of which is incorporated herein by reference.

This invention relates to a refractory heat transfer module for heating a gas such as hydrogen and to methods for making such modules. More particularly, the invention relates to a module for use in space in combination with a concentrator for solar flux that would focus concentrated solar rays upon the module which would serve as a high temperature heat sink particularly designed to raise the temperature of hydrogen gas, from a cryogenic source of hydrogen, so that such heated gas stream can be discharged through an exhaust nozzle to create space propulsion.

BACKGROUND OF THE INVENTION

The Integrated Solar Upper Stage (ISUS) is an advanced orbital transfer vehicle which is designed to be capable of generating electrical power and providing thrust which enables it to efficiently transfer payloads from low earth orbits to higher Molniya or geosynchronous orbits. A series of papers were published in 1995 reporting upon the then current design of the ISUS, i.e. IECEC 95 Papers Nos. AP-398, AP-399, AP-400 and AP-401 (ASME 1995). U.S. Pat. No. 5,459,996 discloses a different type of solar rocket designed to burn propellant, and U.S. Pat. No. 5,113,659 discloses a receiver for use in space vehicle operations designed to use solar energy to heat sodium in heat pipes. The disclosures of these two patents and these four papers are incorporated herein by reference.

The ISUS vehicle, as it orbits earth in a low orbit, is designed to collect solar flux via a tracking receptor system and focus the flux upon a concentrator, providing a concentrated source of heat. This heat source is to be used to drive the temperature of a receiver up to about 2500 K. A valve arrangement is provided to appropriately supply hydrogen gas from a cryogenic source which is caused to flow through internal passageways within the high temperature receiver so as to heat the gas to a temperature approaching that of the receiver itself. The heated hydrogen is then exhausted through a nozzle so that it functions as a propellant, providing thrust with high specific impulse, and as such can be employed to transfer the ISUS to a higher orbit above the earth. The design of the ISUS also allows heat from the receiver to be selectively radiated to an array of thermal energy converters, such as thermionic converters, which can produce electrical power. The purpose of the overall design is to employ a cryogenic hydrogen source to intermittently provide thrust to raise the orbit of the ISUS during approximately a 30-day period following launch and to thereafter provide electrical power for about 15 years by concentration of solar flux and radiation to the thermionic converters.

Because of the high temperatures which are involved in heating a gas such as hydrogen sufficiently to enable it to be efficiently used as a propellant in the far reaches of the earth's atmosphere, it is found necessary to very carefully isolate such hydrogen gas from the refractory material body that will be used as the heat sink receiver in order to prevent chemical attack by hydrogen thereupon. Solutions to this problem are being actively sought.

SUMMARY OF THE INVENTION

It has been found that a receiver in the form of a body of a refractory material, such as graphite, can be provided with internal passageways through which a gas, such as hydrogen, can be allowed to slowly flow in order to raise its temperature to above 2000 K and increase its pressure enabling it to be effectively used as a propellant by discharge through an appropriate nozzle. By lining these passageways with boundary material in the form of wrought refractory metal, such as wrought rhenium(Re), an effective barrier is provided having good thermal conductivity.

Because it is also necessary to prevent the graphite or other refractory material receiver that is heated to a high temperature from evaporating in the extremely low pressure environment at the fringes of the earth's atmosphere, external cladding for the receiver is also required. It is found that wrought rhenium sheeting may also be used to totally encapsulate the receiver by its appropriate joinder to ends of the passageway-providing rhenium liners that protrude from the graphite body receiver. For example, fusion bonding of sections of Re sheeting or alternative methods of encapsulating the high temperature refractory material receiver, such as chemical vapor deposition (CVD) coating, may be used that are compatible with such wrought rhenium passageway liners.

BRIEF DESCRIPTION OP THE DRAWINGS

FIG. 5 is a schematic view similar to FIG. 3 showing an alternative polygonal annular receiver.

FIG. 6 is a schematic sectional view taken along line 6—6 of FIG. 5.

FIGS. 7A, 7B and 7C show three different modular construction concepts that might be used in the FIG. 5 receiver.

FIGS. 8 and 9 are fragmentary schematic sectional views showing further alternative constructions for an annular receiver.

DETAILED DESCRIPTION OF THE PREFERRED EMBODIMENT

Figure 1:
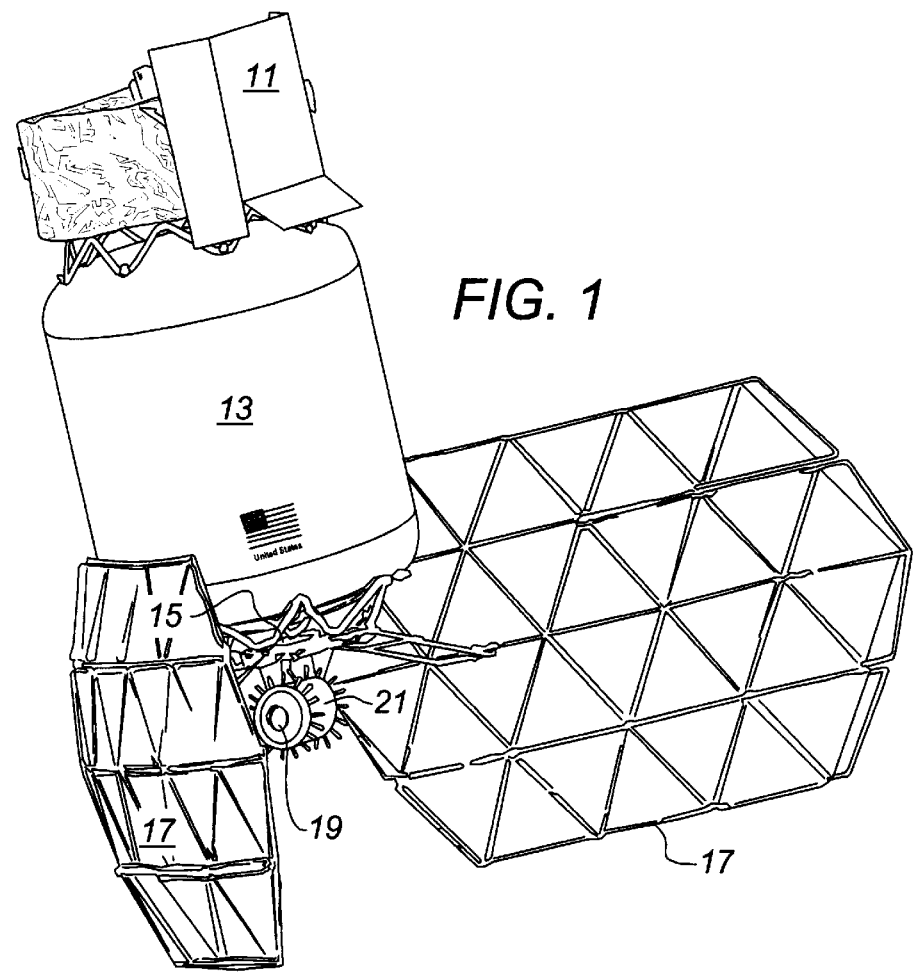
FIG. 1 is a diagrammatic perspective view showing an example of an ISUS vehicle which incorporates a propulsion device embodying various features of the present invention.

The ISUS is an advanced transfer orbital vehicle which, as depicted in FIG. 1, is designed to propel a payload 11 from a low earth orbit to a higher Molniya or geosynchronous orbit. In the illustrated arrangement, the payload 11 is appropriately mounted atop a large tank 13 of liquified gas, such as cryogenic hydrogen, and affixed to the opposite or bottom end of the tank 13 is structural framework 15 to which the remainder of the operative components are generally connected. Shown are a pair of solar concentrator assemblies 17 which may be formed of a plurality of triangular segments arranged in a parabolic array and which would be appropriately deployed once the vehicle has reached its low earth orbit. Centrally below the framework a propulsion system 19 is mounted which includes an annular collector or receiver 21 capable of storing heat at a high temperature, e.g. above 2500 K. The mirrored solar concentrator assemblies collect solar flux, being positioned and oriented via a tracking receptor system, and may focus the flux to travel into opposite ends of the receiver and onto a director (not shown) which in turn directs the concentrated solar flux onto the interior surface of the annular receiver 21. A concentrating mirror assembly, such as that disclosed in the '996 patent, may alternately be employed; either arrangement would be separately controlled to orient the assembly to receive, concentrate and direct the available sunlight.

Figure 2:
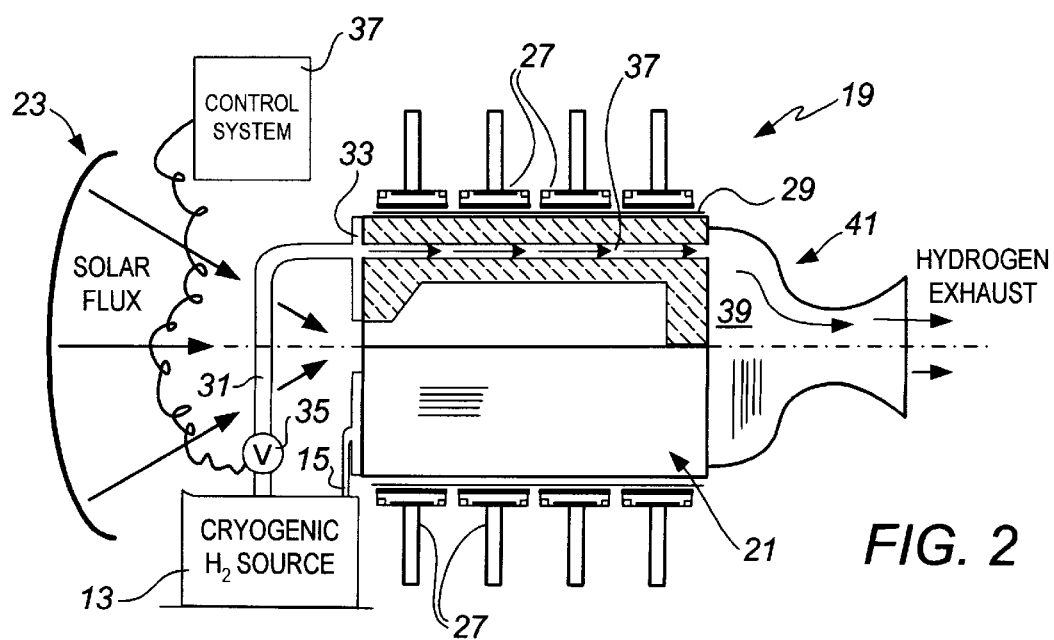
FIG. 2 is a schematic drawing showing the propulsion device of FIG. 1 including the annular receiver, the cryogenic hydrogen supply tank and the solar concentrator.

The arrangement is perhaps better understood from FIG. 2 which schematically illustrates the various components of the propulsion system 19. Depicted is a high temperature receiver 21 which is generally annular in shape having a hollow interior with one end, e.g. the outlet end being optionally closed or left open. A solar concentrator assembly 23, which may include the parabolic mirror panels 17, collects rays from the sun and concentrates them, directing them into the hollow interior of the high temperature receiver. If desired, a secondary director (not shown) can be employed in tandem with the illustrated solar concentrator 23 to dispense the solar flux once it has reached the interior of the receiver. Located about the periphery of the annular receiver 21 are a plurality of thermal energy converters, such as thermionic converters 27 which are designed to create electricity when heat is transferred to them from the heated, high temperature receiver 21 once the vehicle has reached its ultimate orbit. A generally tubular shield 29 is disposed between the outer surface of the high temperature receiver 21 and the thermionic converters 27 which shield serves to radiate heat back to the receiver, which it surrounds, during the initial period when hydrogen gas is being heated to propel the space craft to an orbit higher above the earth. Once a final orbit has been reached, the shield 29 is withdrawn, similar to the insulation sleeve in the '996 patent, so as to radiatively couple the thermionic converters 27 to the radiating exterior surface of the high temperature receiver 21.

The cryogenic hydrogen source, i.e. the tank 13 containing liquified hydrogen, is connected by a conduit 31 to an inlet plenum 33 to the high temperature receiver so that hydrogen from the source can be transferred to the receiver. A suitable valve 35 is provided to control flow in the conduit 31, and the valve is controlled via electrical connection to a control system 37. The receiver 21 is structurally linked to the tank 13 through the framework 15. As explained in more detail hereinafter, hydrogen vapor or gas is routed to a plurality of passageways 37 extending from one end to the other of the high temperature receiver 21 wherein the hydrogen is heated to an extremely high temperature thereby rapidly increasing its volume. The passageways 37 are lined with suitable material 38 and discharge into a plenum 39 leading to a nozzle 41 from which the heated hydrogen discharges, creating a propulsive effect which is appropriately directed so as to continue to raise the level of the ISUS above the earth until it reaches its desired orbit, at which time the valve 35 is closed. It is anticipated that the valve 35 will be opened intermittently whenever the receiver reaches a target high temperature, e.g. up to about 2500 K, and then closed when flow of the $H_2$ cools the receiver below about 1800 K. Either the discharge from the nozzle can be directed so as to propel the ISUS in the desired upward direction, or separate vectoring rockets or jets are provided on the ISUS to effect the desired attitude of the ISUS before the valve 35 is opened.

Figure 3:
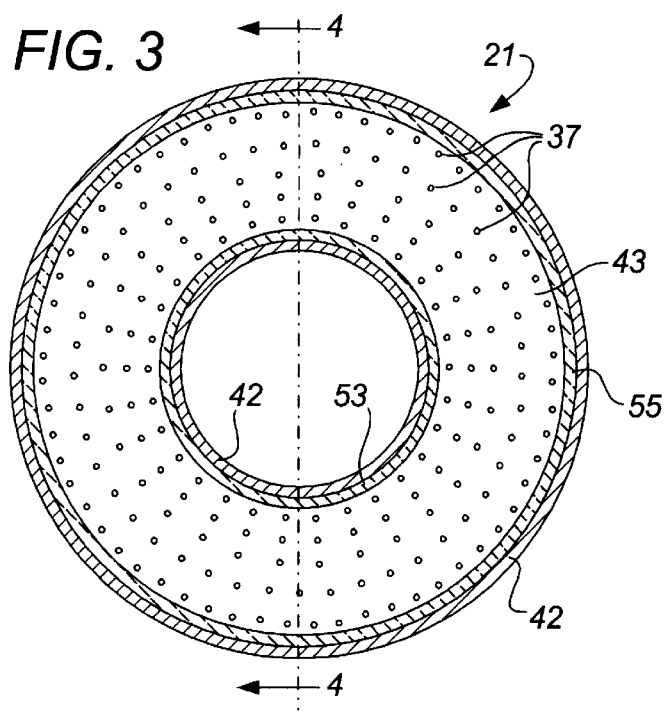
FIG. 3 is a schematic sectional view through an annular receiver exemplifying the type depicted in FIG. 2.
Figure 4A:
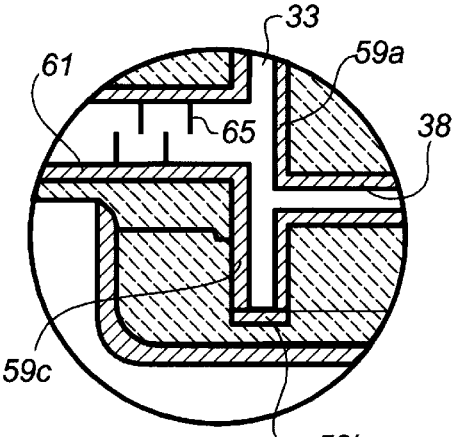
FIG. 4A is a fragmentary enlarged view of a portion of FIG. 4 shown in circular outline.
Figure 4:
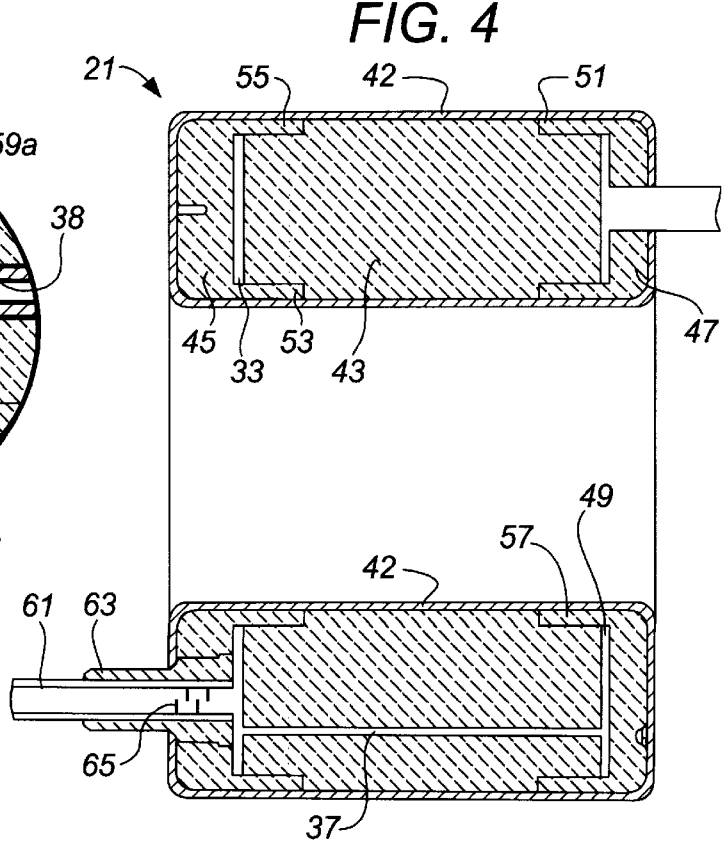
FIG. 4 is a sectional view taken along line 4—4 of FIG. 3.

Details of a high temperature receiver 21 are shown schematically in FIGS. 3 and 4. The ISUS unit is designed to intermittently provide propulsive thrusts for up to about 30 days and to thereafter provide electrical power for up to about 15 years via the radiative coupling of the thermionic converters 27 to the high temperature receiver 21. To best perform its desired function, the receiver 21 includes a high heat capacity body 43 having a generally annular configuration which provides an interior cavity to which solar heat can be effectively supplied, as by using a solar concentrator 23 that is part of a tracking reflector system which is designed to focus solar rays on the interior walls of the cavity either directly or in tandem with a secondary concentrator.

It is desired that the hydrogen vapor be heated to a high temperature, to above 2000 K and preferably to about 2500 K or above; thus, the body 43 must be able to withstand still higher temperatures, preferably about 100° to 200° higher, and also should have a high heat capacity so as to retain a substantial amount of heat when the ISUS vehicle is eclipsed by the earth. Thus, the body 43 should be formed from a refractory material that is structurally strong, has a high heat capacity and a high thermal conductivity, and can function for an extended duration at temperatures above 2500 K. Generally, suitable materials are considered to include carbon, graphite, boron, carbon-carbon composites, boron carbide, niobium carbide, hafnium carbide, and boron nitride; graphite is preferred.

Because the hydrogen propellant is chemically reactive with many materials including graphite, it is considered important that the high temperature refractory material be isolated from the hydrogen gas flowing in the passageways 37 through the receiver to prevent it from chemically attacking the graphite, and because many of these high heat capacity refractory materials have a substantial vapor pressure at temperatures above 2500 K, it is also felt to be important that the entire receiver 21 be encapsulated to prevent evaporation and contamination of optical components or escape into outer space.

The passageways 37 are lined with material 38 (see FIG. 4A) that isolates the refractory material body 43 from the hydrogen, and refractory metal sheeting is preferred. It has been found that a refractory metal having a large grain microstructure, i.e. with grains having an average size above about 30 µm, and having a random grain orientation have surprisingly excellent resistance to diffusion of hydrogen therethrough. It is also considered important that the refractory metal sheeting should have reasonably high tensile strength and hardness so that relatively thin sheeting can be employed as weight is an extremely important consideration in a space vehicle. In this respect, it is believed that the refractory metal should have a tensile strength of at least about 500 MPa and should have a Rockwell A hardness of above about 50. Moreover, the refractory metal should have a melting point above 2700 K, and suitable refractory metals include rhenium(Re), tungsten, molybdenum, niobium, osmium and tantalum. Wrought rhenium metal has excellent characteristics and can be provided with physical characteristics which meets all of the foregoing criteria. Wrought rhenium metal has random grain orientation, and it should have an average grain size of about 40–60 µm. The wrought rhenium metal desirably also has a tensile strength of between about 625 and 800 MPa and a Rockwell A hardness between about 53 and 63. Re provides a combination of extremely high resistance to hydrogen diffusion together with good strength and toughness, and it also has a melting point of about 3450 K. Thermal conductivity is also considered to be important as the purpose is of course to transfer heat from the graphite or other heat sink material to the hydrogen gas flowing in the lined passageways. In this respect, it is felt that thermal conductivity should be at least about 30 watts per meter per Kelvin, and rhenium qualifies at a value of about 47.9 W/mK. Wrought rhenium of the foregoing physical characteristics is preferred.

For external cladding 42, a material having a melting point above 2700 K again should be used. Rhenium, tungsten, molybdenum, niobium, osmium and tantalum, either in elemental form or in the form of carbide, nitride or boride, are considered suitable. Such cladding can be applied by CVD, hot isostatic pressing (HIP), reaction sintering or pack cementation. Again, rhenium metal is preferred, and wrought rhenium is more preferred.

As depicted in FIGS. 3 and 4, the receiver 21 may include a unitary main body 43 of graphite which mates with a pair of annular graphite caps 45, 47. A plurality of parallel passageways 37 extend completely through the annular body 43 in a direction parallel to the axis thereof and serve as channels within which the gaseous hydrogen propellant is heated to a high temperature. The caps 45, 47 facilitate the creation of the inlet manifold 33 and an outlet manifold 49 at the opposite ends of the annular body. More specifically, each end of the annular body is provided with an annular outer shoulder 51 and an annular inner shoulder 53, against which shoulders circular exterior and interior flanges 55, 57 of the end caps snugly fit.

In the illustrated embodiment, to isolate the hydrogen gas from the graphite, each of the passageways 37 is lined with sheeting 38 of wrought rhenium having a thickness of at least about 0.1 mm and preferably having a thickness of at least about 0.2 mm which has been rolled into a tube and seam-welded. Wrought rhenium has excellent thermal conductivity and has a crystalline structure that is particularly resistant to slow diffusion of hydrogen therethrough; as such, it is the definite material of choice for the passageway liners. The inlet and outlet manifolds are also completely lined with wrought rhenium sheeting 59 (see FIG. 4A), which is suitably fusion bonded, as by welding, along circular openings to each of the passageway liners that protrudes through the end face of the high temperature body 43. The tubular liners preferably terminate generally flush with the inner face lining of the manifold and are electron-beam welded to aligned circular openings in the plenum wall.

The inlet plenum end cap 45 contains an inlet conduit 61 which is suitably fusion bonded, as by electron-beam welding, to the outer face liner of the inlet manifold 33, and the inlet end cap 45 also contains a graphite plenum support 63 which is fixedly mounted in a larger opening in the graphite end cap, surrounding the inlet tube while being spaced slightly radially outward therefrom. It serves the purpose of providing physical support for the inlet tube at the entrance into the end cap 45. The inlet tube also contains a series of alternating semicircular baffles 65 (four are illustrated) which prevent any line of sight path from the high temperature receiver through the inlet tube back toward the cryogenic hydrogen supply that might undesirably raise the temperature of the cryogenic hydrogen in the tank.

Because it is desired that the inlet manifold 33 (as well as the outlet manifold 49) be totally sealed about its edges so hydrogen entering through the inlet tube 61 can flow out only through the passageway liners, it is preferably constructed separately and installed in place prior to the installation of the inlet end cap 45. In this respect, all of the passageway liners 38 may first be inserted through the annular graphite body 43 and positioned with their ends positioned in the openings in the interior manifold face sheet. After electron-beam welding the ends of the liner tubes to the face sheet 59a at one end, using an ordered, criss-cross type pattern to minimize any distortion of the thin face sheet, the face sheet at the other end of module would be similarly welded into place. Next, short tubular segments or bands 59b that constitute the radially inner and outer surfaces of the manifolds are welded into place. Finally, the exterior face sheets 59c having either an inlet or an outlet tube attached would be welded to the free edges of the short tubular band 59b to complete the two manifold assemblies.

The end caps 45, 47 are affixed to the annular main body 43 of the receiver after the respective manifolds are installed, and they may be physically joined using a plurality of radially aligned graphite plugs that would pass through one or both of the tubular flanges 53, 57 of the respective end caps. However, such joinder may be unnecessary if rhenium sheet or the like is used to clad the exterior of the receiver and thus create a structurally confining jacket about the entire receiver. In this respect, CVD rhenium may be applied to the exteriors of the receiver body and the end caps, because such surfaces do not have to seal against hydrogen leakage and CVD rhenium can serve as an effective barrier to prevent loss of the refractory material by slow evaporation. Because such CVD-applied rhenium would not physically join the end caps to the annular body, thus requiring some separate physical connection, cladding of the receiver in fusion-bonded rhenium sheeting may be preferred.

Because the propulsion unit 19 will be subjected to large changes in temperature, i.e. from ambient temperatures at which it is constructed and launched into space to operating temperatures of as high as about 2700 K, it is important that the refractory heat sink material for the receiver be physically compatible with the liner and cladding material. This is particularly important with the passageway liner material because it is important that there be excellent heat conduction from the heat sink through the passageway liners and into the flowing hydrogen stream. It is found that it is important to match the thermal conductivities of the passageway liner material and the heat sink material; they are preferably within about 5% of each other. Wrought rhenium metal has a coefficient of linear thermal expansion (CTE) of about $8 \times 10^{-6}$/C at 2500 K. It is found that highly isotropic graphite, which is sold by the Poco Graphite Company of Decatur, Tex. as Poco Grade TM, has a CTE of about $8.3 \times 10^{-6}$ C at 2500 K, which closely matches that of wrought rhenium.

To show the viability of such a construction for the receiver, a test was carried out using a demonstration module having three parallel flow passageways, each of which has a liner fashioned from wrought rhenium sheet having a thickness of about 0.2 mm. The Re sheet was welded into tubes using electron-beam welding, which were then annealed at 1600° C. to relieve any stresses that might have been generated. Strong leak-tight joints were created at the ends of the tubes to the interior annular face plates of manifolds. The inlet tube had four alternating semicircular baffles installed to reduce the thermal load upstream to the inlet structure. The inward facing ends of the inlet and outlet tubes were similarly welded to manifold exterior face sheets. Graphite end caps were installed onto the body and joined together through the use of radial pins; the exterior surface of the device was CVD coated with a thickness of about 0.7–0.8 mm CVD rhenium.

The demonstration unit was heated to about 2300 K, and then hydrogen flow commenced and was continued during a cool down period until a temperature of about 1300 K was reached. At that point, hydrogen flow was terminated, and electrical power was restored in order to return the temperature back to 2300 K. Heating was carried out to raise the temperature about 20 K per minute, and the cooling rate was about 200 K per minute. Following ten thermal cycles, the demonstration unit was subjected to a 12-hour isothermal test at 2300 K. At the conclusion of such hot hydrogen testing, the unit was visually and microscopically examined, and no cracks, blisters, delaminations or deformations of the outer CVD rhenium coating were apparent. Leak testing of the components was then carried out using Helium Mass Spectrometer Leak Detecting, and the rhenium structure was leaktight to $5 \times 10^{-7}$ cm$^3$/s. As a result of the testing, the outer CVD coating was considered to form an adequate hermetic barrier. No holes or cracks were detected by the leak testing, and the structure was considered to provide adequate isolation of the interior Poco graphite body from the hydrogen gas flowing in the rhenium tubes at temperatures as high as 2300 K.

Disclosed schematically in FIG. 5 is an alternative receiver construction 71 which is modular instead of unitary, being formed of separate modules 73 that are suitably linked together; eight modules are shown. The receiver is generally annular in shape; it could have circular interior and/or exterior peripheries, instead of the octagonal shape which is shown. It lends itself to more efficient construction through the assembly of eight separate but identical modules. Such construction facilitates the fabrication of suitable receivers of larger size, compared to the construction shown in FIGS. 3 and 4, which is dependent upon the ability to obtain an annular body of graphite of the desired overall size. The fabricated module illustrated in FIG. 6 and those illustrated in FIGS. 7A, 7B and 7C are examples of structures suitable for such modular construction of a large, generally annular receiver from individual pieces or modules.

The details of one such module are shown in the schematic sectional drawing FIG. 6. The module 73 is intended to be constructed with an outer can 75 formed from welded sheets of wrought rhenium. Each module would have its own hydrogen inlet tube 77, extending upward from the upper wall of the can, and its own outlet tube 79 depending from the bottom wall of the can 75. In such a modular construction, the conduit 31 downstream of the valve 35 would be branched with a separate branch leading to each inlet 77. Likewise, if the outlet tubes 79 did not discharge into a plenum leading to the nozzle, suitable tubular connections would be provided.

A receiver body in the form of a block 81 of graphite of trapezoidal cross-section would be centrally located, vertically within the can 75, leaving an upper inlet plenum and a lower outlet manifold. Apertured face sheets 83, 85 would be located in juxtaposition with the top and bottom surfaces of the graphite body 81. As previously generally described, the edges of these face sheets would be suitably electron-beam welded to the interior surface of the confining rhenium metal can 75. A plurality of parallel passageways would be drilled or otherwise formed in the graphite body 81 extending vertically from the top to the bottom surface. Each one of these passageways has inserted therein a wrought rhenium metal liner 87 in the form of a seam-welded tube, and the upper and lower ends of these tubular liners are electron-beam welded to circular openings in the respective face sheets 83, 85 to seal the graphite body totally from the flowing hydrogen gas.

In FIGS. 7A, 7B and 7C, examples of three different alternative modular structures are shown. Illustrated in FIG. 7A is a module 91 which is fabricated from four flat plates 93 of refractory material, such as Poco graphite, which alternate with three flat plates 95 of wrought rhenium metal in which there are bored a series of parallel passageways 97 for the flow of hydrogen gas being heated. The module 91 is trapezoidal in cross-section with the exterior surfaces being clad with thin rhenium metal sheeting 99 as in the module 73. The rhenium metal plates 95 which carry the passageways and the adjacent graphite plates 93 are joined together in any satisfactory manner so as to create an integral structure in which there is good heat conduction radially outward throughout the final structure from the interior surface where the solar flux will be focused. For example, a powdered material, such as hafnium oxide, may be applied at the surfaces of joinder before the overall module is subjected to hot isostatic pressing (HIP) to assure a strong heat-conducting bond is achieved. Alternatively, one or both of the surfaces may be coated, as by plasma-spraying, with a suitable refractory material, such as hafnium oxide at about 50% of its theoretical density, before the module is subjected to HIP.

Illustrated in FIG. 7B is a module 101 which is constructed from a plurality of graphite plates 103 and rhenium plates 105 having flat surfaces which are aligned generally perpendicular to the two parallel surfaces of the trapezoid, as opposed to parallel thereto. The wrought rhenium plates 105 similarly have a plurality of parallel passageways 107 bored or otherwise suitably formed therein for carrying hydrogen gas to be heated, and they are suitably bonded to each adjacent pair of graphite plates as previously described. The exterior of the module is again clad in Re sheeting 109. The module may be clad using hot isostatic pressing (HIP) with sections of Re sheet in juxtaposition with the exterior surfaces, or alternatively, by CVD or by reaction sintering or by pack cementation using rhenium, tungsten, molybdenum, niobium, osmium, or tantalum in elemental form or in carbide nitride or boride form. As previously indicated, the important objective is to encapsulate the refractory heat sink material in a manner that will prevent its evaporation.

Illustrated in FIG. 7C is a module 111 that includes a unitary block 113 of Poco graphite or the like having a trapezoidal cross-section similar to those in FIGS. 7A and 7B. The block is formed with a plurality of pairs of small passageways 115 for carrying hydrogen gas which are alternated with large bores 117 of circular cross-section. The small passageways 115 would be lined with wrought rhenium metal liners, as previously described with regard to the module 73 shown in FIG. 6; the large bores 117 are employed to increase the overall heat capacity of the annular receiver. From the standpoint of heat capacity, graphite has a $C_p$ equal to about 8.5 joules per Kelvin per mole, and to increase the overall heat capacity of the receiver, the large diameter bores 117 are filled with rods of a higher heat capacity material, such as beryllium or beryllium oxide. Be has a $C_p$ equal to about 16.4 joules per Kelvin per mole. The exterior and interior surfaces of the module would be similarly clad with sheeting 119 of a barrier material, such as rhenium metal as described above.

FIG. 8 illustrates an annular receiver 121 which uses essentially the same construction as that used to construct the module 101 shown in FIG. 7B. Radially oriented rhenium metal plates or slabs 123 have parallel hydrogen flow passageways 125 machined or otherwise formed therein, and they are suitably joined to graphite plates 127 having arcuate interior and exterior surfaces. The individual pieces could be suitably assembled in quadrants or the like, terminating with graphite plates of only half the usual thickness which could then be suitably joined to one another as by using connecting pegs or the like. Again, the individual graphite plates 127 could have their radially interior and exterior surfaces clad with a barrier coating prior to assembly. Alternatively, once the entire annular receiver 121 is assembled, it could be clad using unitary sheets 129 of wrought rhenium metal or the like. A suitable inlet manifold would be constructed to supply hydrogen vapor to the inlet ends of all of the passageways, like the manifold 33, and a suitable outlet manifold and nozzle structure would be affixed to the outlet end of the receiver so as to direct the entire exhaust flow of heated hydrogen gas through a single nozzle.

Illustrated in FIG. 9 is an alternative construction to that of FIG. 8 wherein, instead of plates of wrought rhenium metal having flat surfaces, slabs 131 are used which have corrugated or undulating surfaces, having regular peaks and valleys, with a hydrogen passageway 133 being contained in the region between each pair of peaks. The graphite blocks 135 have matching undulating surfaces. The arrangement is otherwise the same as the receiver 121, with an exterior can 137 of wrought rhenium metal. The undulating construction of matching surfaces between the juxtaposed rhenium slabs 131 and graphite blocks 135 may provide a stronger structural interconnection and increased heat transfer.

Although the invention has been illustrated to show the best modes presently contemplated by the inventors for carrying out the inventive concept, it should be understood that various changes and modifications as would be obvious to one having ordinary skill in this art may be made without departing from the scope of the invention which is defined by the claims appended hereto. For example, although the annular receivers are generally shown as being open at both ends, it should be understood that the end of the receiver adjacent the nozzle could be closed, as illustrated in the schematic of FIG. 2, so as to perhaps better confine the heat being transferred via the concentrated solar flux to the interior annular surface of the receiver.

Particular features of the invention are emphasized in the claims which follow.

What is claimed is:

1. A device for heating hydrogen gas to a temperature above about 2000 K, which device comprises a graphite body designed to receive concentrated solar heat, passageway means in said graphite body for the flow of a gas therethrough so as to facilitate heat transfer from said graphite body to said gas, and tubular wrought rhenium metal boundary means lining said passageway means, said rhenium having a thickness of at least about 0.1 mm and being capable of limiting the evaporation of said graphite body and preventing said gas from reaching and chemically reacting with said graphite body.

2. The device of claim 1 wherein said wrought rhenium metal has a large grain microstructure with random grain orientation.

3. The device of claim 1 wherein said wrought rhenium metal has a tensile strength of at least about 625 MPa.

4. The device of claim 1 wherein said wrought rhenium metal has a Rockwell A hardness of between about 53 and about 63.

5. The device of claim 1 wherein said graphite body is totally encapsulated in wrought rhenium and said passageway means comprises a plurality of generally parallel passageways which are separated by rhenium from said graphite body and which are arranged so that there is heat conduction from said graphite body to said rhenium.

6. The device of claim 5 wherein said parallel passageways are individual bores in said graphite body that are lined with wrought rhenium.

7. The device of claim 5 wherein said parallel passageways are bores in a body of wrought rhenium which rhenium body is flanked by portions of said graphite body.

8. The device of claim 7 wherein said rhenium bodies are slabs having undulating surfaces and wherein a plurality of said slabs are present in radial alignment sandwiched between said graphite body portions which have complementary surfaces, so that said slabs and said graphite body portions together provide an annular structure which is completely encapsulated in wrought rhenium.

9. The device according to claim 5 which includes a source of said gas in a liquified state, inlet tube means leading from said source of liquified gas, first manifold means interconnecting said inlet tube means and said plurality of parallel passageways at inlet ends of said passageways, and second manifold means connecting exit ends of said passageways to outlet means for said heated gas.

10. The device of claim 9 wherein said inlet tube means contains baffle means which prevents transfer of heat by radiation to said liquified gas source from said rhenium-lined passageways of said graphite body.

11. An outer space propulsion device which device comprises a source of liquified hydrogen under superatmospheric pressure, means for controlled release of hydrogen gas from said source, means for heating said hydrogen gas to a temperature above about 2000 K, comprising a graphite body designed to receive concentrated solar heat, passageway means in said graphite body for the flow of gaseous hydrogen therethrough so as to facilitate heat transfer from said graphite body to said gaseous hydrogen; and tubular wrought rhenium metal boundary means lining said passageway means, said rhenium having a thickness of at least about 0.1 mm and being capable of limiting the evaporation of said graphite body and preventing hydrogen from reaching and chemically reacting with said graphite body; and nozzle means for the discharge of heated hydrogen gas from said passageway means.

12. The device according to claim 11 which includes inlet tube means leading from said source of hydrogen to first manifold means interconnecting said plurality of parallel passageways at inlet ends thereof, and second manifold means connecting exit ends of said passageways to said nozzle means.

13. The device of claim 12 wherein said inlet tube means contains baffle means which prevents transfer of heat by radiation to said liquified hydrogen source from said rhenium-lined passageways of said graphite body.

14. An integrated upper stage receiver of a type useful for receiving, absorbing and concentrating solar flux for the purpose of heating a gas and radiating heat into an array of thermal energy converters in order to produce electrical power, the integrated upper stage receiver comprising:

a body comprising a high heat capacity refractory material selected from a group of high heat capacity refractory materials consisting of carbon, graphite, carbon-carbon composite, boron carbide, niobium carbide, hafnium carbide, boron, and boron nitride;

internal passageway means through said body including an inlet and an outlet for receiving and expelling a gas, the internal passageway means further including a heat transfer portion for transferring heat from said high heat capacity body to the gas; and an internal lining interposed between said body and said internal passageway means, which protects said high heat capacity refractory material from chemical reaction with said gas, said internal lining comprising refractory metal sheet, said refractory metal being selected from the group of metals consisting of rhenium, tungsten, molybdenum, niobium, osmium and tantalum, and said sheet being bonded to itself along a common edge to form said internal lining.

15. The integrated upper stage receiver of claim 14 wherein said refractory metal sheet is a wrought rhenium sheet.

16. The integrated upper stage receiver of claim 14 wherein said high heat capacity refractory material body is totally encapsulated within external cladding so as to retard vaporization of said refractory material, said external cladding comprising a material selected from the group consisting of rhenium, tungsten, molybdenum, niobium, osmium and tantalum in elemental form or in the form of a carbide, nitride or boride thereof.

17. A method of making an integrated upper stage receiver of a type useful for receiving, concentrating, and absorbing solar flux for the purpose of heating a gas and for radiating heat into an array of thermal energy converters in order to produce electrical power, the method comprising:

forming a body comprising a high heat capacity refractory material selected from the group consisting of carbon, graphite, carbon-carbon composite, boron carbide, niobium carbide, hafnium carbide, boron, and boron nitride;

forming an internal passageway through said body, the internal passageway including an inlet for receiving a gas and an outlet for expelling the gas, and further including a heat transfer portion for transferring heat to the gas; and interposing an internal lining between said body and said internal passageway to protect said refractory material from chemically reacting with the gas being heated, the internal lining comprising a sheet of a refractory metal selected from the group consisting of rhenium, tungsten, molybdenum, niobium, osmium and tantalum, and said interposing including the step of cutting said refractory metal sheet to size and then bonding together edges of said cut sheet to form the internal lining.

18. The method of claim 17 wherein said refractory material body containing said internal passageway is totally encapsulated within external cladding by hot isostatic pressing, by chemical vapor deposition, by reaction sintering or by pack cementation, using a material selected from the group consisting of rhenium, tungsten, molybdenum, niobium, osmium and tantalum in elemental form or in the form of a carbide, nitride or boride thereof.

19. The method of claim 17 wherein said refractory material body containing said internal passageway is totally encapsulated within external cladding of sheet material of a refractory metal selected from the group consisting of rhenium, tungsten, molybdenum, niobium, osmium and tantalum, by fusion bonding said refractory metal sheeting to edges of said passageway internal lining which protrude from surfaces of said body.

* * * * *